United States Patent [19]
Jackson

[11] 3,935,291
[45] Jan. 27, 1976

[54] METHOD OF MOLDING POLYURETHANE ARTICLES IN A MOLD COATED WITH THREE MOLD RELEASE AGENTS

[75] Inventor: William E. Jackson, Bradner, Ohio
[73] Assignee: The Goodyear Tire & Rubber Company, Akron, Ohio
[22] Filed: Aug. 28, 1973
[21] Appl. No.: 392,400

[52] U.S. Cl. ............... 264/331; 264/54; 264/338
[51] Int. Cl.$^2$.. B29C 1/04; B29C 5/00; B29D 27/04
[58] Field of Search ............... 264/48, 54, 338, 331

[56] References Cited
UNITED STATES PATENTS

| | | | |
|---|---|---|---|
| 3,101,244 | 8/1963 | Hood et al. | 264/338 X |
| 3,127,457 | 3/1964 | Di Pinto | 264/338 X |
| 3,210,448 | 10/1965 | Szabat | 264/48 |
| 3,341,646 | 9/1967 | Britain | 264/338 X |
| 3,359,351 | 12/1967 | Bender | 264/338 X |
| 3,502,768 | 3/1970 | Hill | 264/338 X |
| 3,624,790 | 11/1971 | Cekada et al. | 264/54 X |
| 3,669,501 | 6/1972 | Darleth | 264/45 X |
| 3,762,677 | 10/1973 | Adams | 264/45 X |

FOREIGN PATENTS OR APPLICATIONS

| | | | |
|---|---|---|---|
| 624,114 | 7/1961 | Canada | 264/338 |
| 785,733 | 11/1967 | United Kingdom | 264/338 |

OTHER PUBLICATIONS

Billmeyer, Fred W. "Textbook of Polymer Science," New York, Interscience, c1962, pp. 8; 419–423.
Brydson, J. A. "Plastics Material," Princeton, N.J., D. Van Nostrand, c1966, pp. 209–214.
Brandrup, J. and E. H. Immergut, Edts. "Polymer Handbook," New York, Interscience, c1966, p. IV–188.
Zimmerman, O. T. and Irvin Lavine, "Supplement IV to the 1953 Edition of Handbook of Material Trade Names," Dover, N.H., Industrial Research Service, Inc., 1965, p. 358.
"The Condensed Chemical Dictionary," Seventh Edition, Completely Revised and Enlarged by Arthur and Elizabeth Rose, New York, Reinhold, c1966, pp. 921;1014.
Brydson, J. A. "Plastics Materials," Princeton, N. J. D. Van Nostrand, c1966, pp. 64–73.

*Primary Examiner*—Philip Anderson
*Attorney, Agent, or Firm*—F. W. Brunner; J. D. Wolfe

[57] ABSTRACT

A method of molding polyurethane articles using three mold release agents, the first being a halocarbon film, the second a hydrocarbon release agent and the third a polyvinyl alcohol release agent.

5 Claims, 3 Drawing Figures

METHOD OF MOLDING POLYURETHANE ARTICLES IN A MOLD COATED WITH THREE MOLD RELEASE AGENTS

This invention relates to a method of making shaped polyurethanes and applying a nondiscoloring polyurethane coat to the shaped polyurethane and to the method of releasing said shaped polyurethane. More particularly, this invention relates to a method of making a shaped microcellular polyurethane article with a nondiscoloring coating thereon. More specifically, this invention relates to utilizing mold release agents for forming shaped polyurethanes.

In making shaped polyurethanes it is necessary to use a shaper such as a mold or an extruder. Since the shaper tends to adhere to the polyurethane reaction mixture during the shaping it has been the general practice to treat the surface of the shaper with a mold release agent. These release agents have been used very widely and in general have been such materials as waxes, polyethylene and polypropylene and polychlorofluoro alkylenes. Unfortunately, when it has been attempted to apply a nondiscoloring polyurethane coating over the shaped polyurethane article to give an article which is essentially nondiscoloring when exposed to sunlight, it has been found that the nondiscoloring polyurethane coat or paint, which was applied over the shaped polyurethane, tends to become disengaged from the shaped polyurethane surface due to the failure to obtain a satisfactory bond. Heretofore it has been the practice to remove the mold release agent such as polyethylene or wax by treating the surface of the shaped polyurethane article with a suitable solvent such as methylene chloride or trichloro ethylene, ketones and related solvents. It has been the experience that these solvents tend to disrupt or damage the surface of the shaped polyurethane article during the removal of the mold release agent and also require use of relatively expensive equipment to control the solvent loss. Also, even this severe vapor solvent treatment has not been entirely satisfactory in eliminating paint peel.

It is an object of this invention to provide a method of forming a shaped polyurethane article which may be removed from the shaper and be water washed and dried to give a shaped polyurethane article that will readily accept a nondiscoloring polyurethane coating or a paint coat and yet be free of the tendency of the coating to bleed or flake off as has heretofore been associated with polyurethane articles of this nature.

The object and advantages of this invention can be more readily appreciated and understood by reference to the drawings wherein FIG. 1 is a perspective view of one embodiment of a lower part of the mold having part of its release coat thereon;

Figure 2:
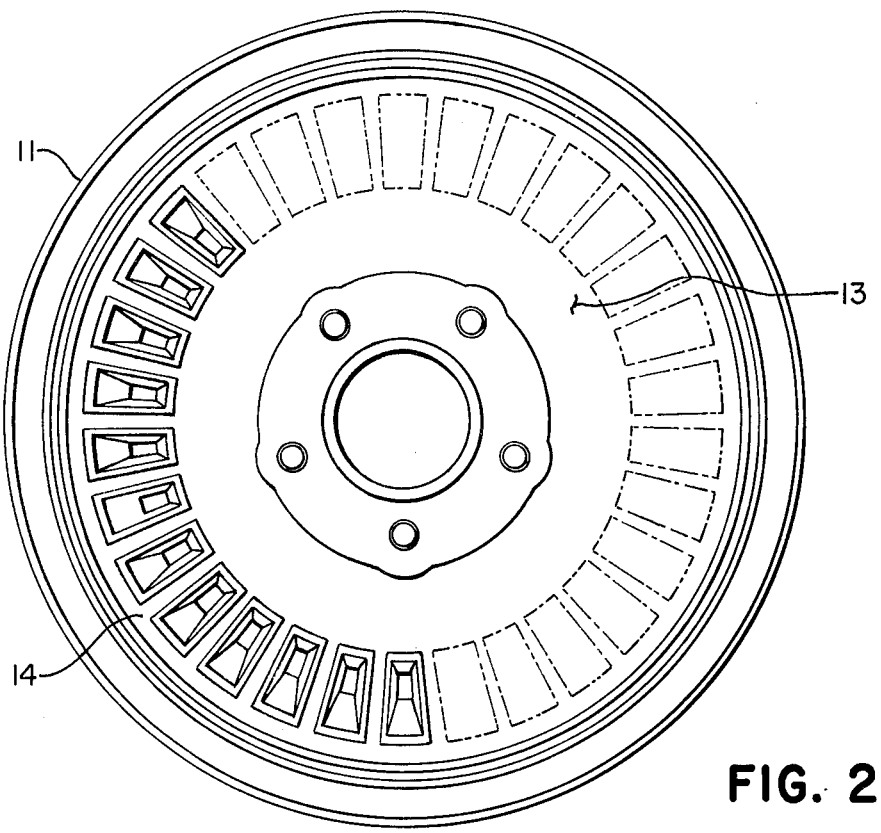
FIG. 2 is a perspective view of a wheel.
Figure 1:
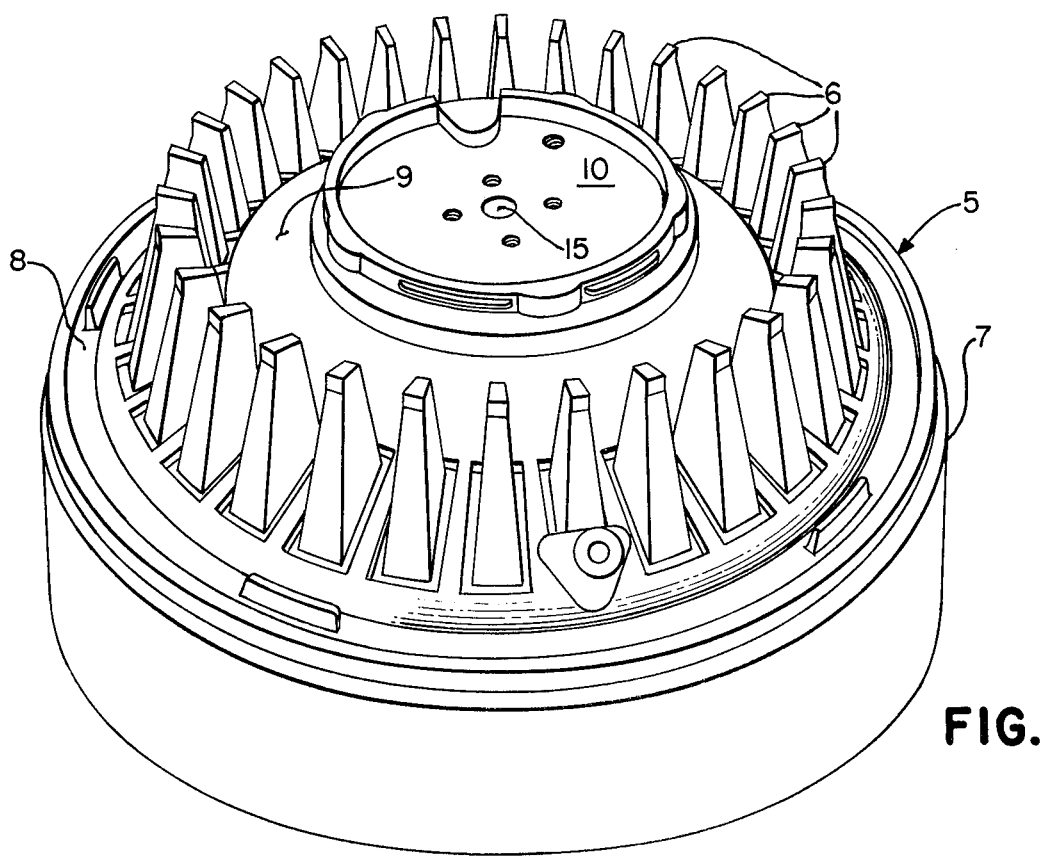

Referring more specifically to FIG. 1, a beryllium copper alloy lower mold part 5 is shown having tapered trapezoidal members 6 projecting upward from the body part 7. The body part 7 has a seal or decorative groove 8 and tapered portion 9 terminating in a hub ring or portion 10. The wheel 11 is placed over the lower mold member 5 in the manner shown in FIG. 3 to form a molding cavity 12 between the outboard face 13 of the wheel and the lower part of the mold. The wheel and lower part of the mold are locked in the position shown in FIG. 3 by the wellknown mold locking means such as Z type clamps not shown.

Since the tapered trapezoidal member 6 produces a hole in the molded plastic member 14 adhered to the wheel, it is extremely difficult to break the vacuum between the tapered trapezoidal member and the tapered hole of the plastic member adhered to the wheel.

To aid the breaking of the vacuum or opening of the mold after the mold locks are released, in one embodiment of this invention the mold is given a special treatment with a unique combination of mold release agents.

The mold preferably is any of the well known mold metals and the most preferred metal is beryllium copper alloy.

Where very intricate molded articles are to be formed, the clean metal mold is coated with a first mold release agent selected from a halogenated hydrocarbon polymer having a melting point above 250°C. to give a film 0.1 to 5 mils thick, with the preferred thickness being 0.2 to 0.8 mils when baked or dried at 300°C. to fuse the polymer into a uniform coat. Over the halogenated hydrocarbon polymer or first release agent coating a second coating of a hydrocarbon solid melting between 60° to 110°C., such as wax, polyethylene or polypropylene is applied by spraying, brushing or other well known means of applying mold release, and dried. This coating preferably is 0.5 to 3 mils thick after drying. An additional or third coat of another release agent is applied over the coats of the first and second release agents to give the ultimate mold release surface.

This third release agent is applied as a barrier coat of a 5 to 10 percent 50/50 isopropanol-water solution of polyvinyl alcohol to give a coating 0.3 to 1.0 mils thick, with the preferred range being 0.4 to 0.7 mols. This coating is dried at 70° to not over about 80°C. and is ready for use.

Figure 3:
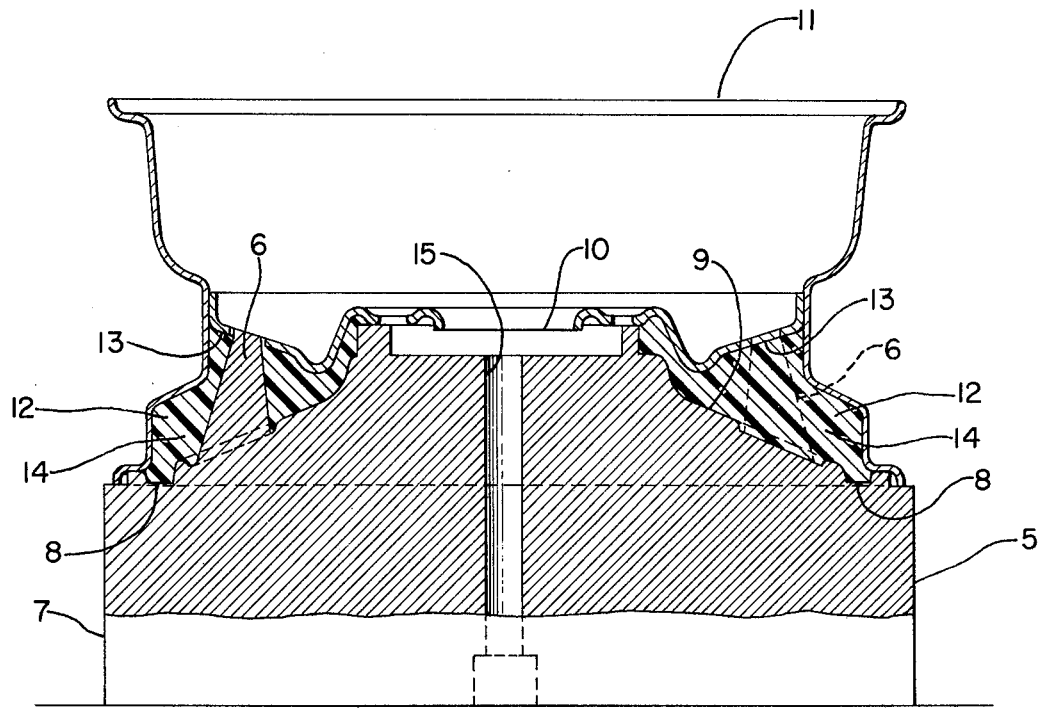
FIG. 3 is a cross-section through the mold composed of lower part of the mold of FIG. 1, having the wheel of FIG. 3 positioned thereon to form a closed mold.

The lower part of the mold having coatings of three different release agents applied in the above manner has a wheel placed thereon in the manner shown best in FIG. 3 and locked to form a complete mold and then this mold is charged through charge port 15 with foamable microcellular polyurethane reaction mixture and allowed to foam and cure. Then the mold is unlocked to permit the wheel having the polyurethane decorative part adhered thereto to be removed from the lower part of the mold. The polyurethane decorative surface strips from the mold very readily and does not tear or affect the aesthetic appearance of the surface of the polyurethane adhered to the outboard face of the wheel. Also, the excess polyvinyl alcohol was readily removed from the surface of the molded part with a water wash, preferably at about 50° to 90°C. to give a molded surface that could be effectively painted when dry as the surface is now free of the wax.

The combination mold release system can be used for repeated moldings, usually for several months, before the polyhalocarbon polymer has to be removed and be recoated with a new coat of polyhalocarbon, provided a second and third release agent treatment is applied after each molding. It should be understood that the second and third mold release agent combination either with or without the semipermanent release coat of polyhalocarbon film produces a unique effect. Namely, the use of second and third mold release agents in combination permits mold parts to be obtained which can easily and readily be given a paint coat that is resistant to bleeding, flaking or peeling.

Thus, some of the advantages of the three combination release coat systems is the polyhalocarbon coating can be applied as a solvent dispersion and then be melted to give a uniform smooth coating or film over the mold surface and serve to prevent stacking in the event of failure of the second and third coats. The second release agents serve to in effect act as lubricant and prime parting agents, i.e. between the first and third mold release agents. The third mold release agent supplies a surface on the molded article which can be cleaned of contaminants by a simple water wash and then be effectively painted.

The fluorocarbons useful in this invention are the highly halogenated chain polymers whose structure is composed substantially exclusively of carbon, hydrogen and halogen atoms. It is preferred that the chain polymers be at least half fluorinated and that $-CH_2-$ groups be present. In other words, at least some of the carbon atoms on the chain should be bonded only to hydrogen atoms and other carbon atoms.

Chain polymers with a minor degree of disorder in their molecules are generally more thermoplastic in nature than those without such disorder. Elasticity requires a greater degree of disorder. In order to obtain an elastomeric product, at least 10 percent of the carbon atoms in the structure must be of the type which are bonded only to hydrogen atoms and other carbon atoms. Ordinarily, a mono-olefinic compound containing a $CH_2=$ group is used to provide these carbon atoms, and this results in chains containing $-CH_2-$ groups. Ordinarily, such a mono-olefinic compound is copolymerized with another highly fluorinated mono-olefin to help give the polymer molecule its highly fluorinated nature.

Among the highly fluorinated mono-olefins which may be used as comonomers are: $CF_2 = CHCl$, $CF_2 = CCl_2$, $CF_3 - CF = CF_2$, $CF_2 = CHCl$, $CF_3 - CCl = CCl - CF_3$, $CF_3 = CHF$, $CF_3 - CH = CH - CF_3$ (cis or trans), $CF_2 = CF_2$,

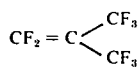

$CF_2 = CHBr$, $CF_2 = CCl - CF_3$, $CF_3 - CH = CH_2$ and $CF_3 - CCl = CCl_2$.

Among the hydrogen containing mono-olefins which may be used as comonomers with the above highly fluorinated monoolefins are: $CF_2 = CH_2$, $CFH = CH_2$, $CH_2 = CH_2$, $CHCl = CH_2$, $CCl_2 = CH_2$, $CClH = CH_2$, $CHBr = CH_2$ and

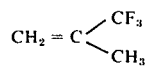

Of these, the most advantageous combinations are: $CF_2 = CFCl/CF_2 = CH_2$, $CF_2 = CF_2/CF_2 = CH_2$, $CF_2 = CF_2/CH_2 = CFCl$, and $CF_2 = CHBr/CF_2 = CH_2$.

The aforementioned mono-olefins may be copolymerized in any proportions, depending on the characteristics desired. Good chemical stability requires fluorine substitution at at least one-half of the possible positions for such substitution in the polymer chain.

It is to be noted that all of the monomers enumerated above contain only carbon, hydrogen and halogen atoms and, therefore, produce copolymers substantially without markedly reactive functional groups. This, of course, does not preclude the presence of other atoms in end groups which might be formed by chain stoppers in the polymerization zone, present by design or by accident. Such end groups are relatively few in number and are difficult to detect. They do not, in any way, affect the characteristics of the polymer to any noticeable degree.

Fluorocarbons especially valuable and useful in this invention are those having a density at 25°C. in grams per cubic centimeter of about 2.1, a melting point of about 300°C. and a molecular weight of about 3700 and usually less than 8000. These materials are available from du Pont de Nemours & Company under the trademark VYDAX, a fluorotelomer which is trichlorotrifluoroethane dispersion of a white, waxy shortchain telomer of tetrafluoroethylene. Usually the dispersions are available up to 20 percent solids by weight and can be diluted to permit their ready applicatioon by brushing or spraying.

Specific examples of particular urethane materials and the molding die temperatures and curing time, presented by way of illustration of the use of multiple mold release agents, and the method and product of this invention and not by way of limitation (all parts are by weight unless otherwise designated) are as follows:

EXAMPLE I

A beryllium copper alloy lower mold part was cleaned mechanically as well as in a trichlorethylene degreaser and spray coated with a 5 percent dispersion of a waxy shortchain telomer of tetrafluoroethylene in trichlorotrifluoroethane to give a film 0.3 to 0.5 mil thick after fusing by heating up to the minimum fusing temperature of about 300°C.

This short chain telomer of tetrafluoroethylene coated lower mold part was placed on a molding conveyor and moved through a preheat oven to heat the lower mold part to a 70°C. and then given a spray coat of a naphtha solution of polyethylene, mold release grade, to give a dry film of 0.5 mil thick over the short chain telomer of tetrafluoroethylene. Normally, the polyethylene film should be 0.3 to 0.8 mil thick.

This polyethylene coat was top coated with a spray coat of a 50/50 isopropanol-water solution of polyvinyl alcohol while the mold part was still sufficiently hot to remove the solvent.

A wheel was placed on the lower mold part with the outboard face of the wheel next to the lower mold part to form a mold cavity. A decorative face was molded on the wheel by injection through the charge port in the wheel, a charge of a foamable polyurethane mixture shown below in Example A. This lower mold part was used for several thousand moldings with only new applications of polyethylene and polyvinyl alcohol release agents.

EXAMPLE A

A microcellular polyurethane reaction mixture was prepared by machine mixing simultaneously the following ingredients:

| Ingredients | Parts |
|---|---|
| An acrylonitrile grafted polypropylene ether diol-triol of 165 hydroxyl number | 100 |
| Water | 0.2 |

-continued

| Ingredients | Parts |
| --- | --- |
| Triethylene diamine | 0.07 |
| Dibutyltin dilaurate | 0.14 |
| Quasi prepolymer of toluene diisocyanate reacted with less than 1000 molecular weight polypropylene ether diol to give 30% free NCO content | 45 |

This microcellular polyurethane reaction mixture was charged into the mold cavity of FIG. 3 to form the ornamental portion of the wheel after reaction at 60° to 80°C. for approximately ten minutes and removed from the mold.

The unique mold release combination of this invention can be used with any polyurethane reaction mixture of either the foamable or homogeneous types, i.e. the polyether and polyester polyol organic polyisocyanate types. It was applicant's experience that the use of a single or any two of the three mold release agents gave problems either in getting satisfactory mold release, especially with complicated mold shapes, and in getting a polyurethane decorative part that could be painted without loss of paint due to peeling.

EXAMPLE II

A wheel having the polyurethane decorative face adhered thereto was given a hot water (75° to 95°C.) wash and dried at 110°C. and spray painted with a polyurethane paint and baked for 20 minutes at 120°C. to give a decorative wheel that has a decorative cover which is resistant to paint peel.

EXAMPLE III

After the lower mold part had been used daily for several months on the molding line, it slowly accumulated debris, due to loss of the halocarbon film, that effected the appearance of the molding and had to be removed from the line.

This lower mold part then was dipped in a bath for 15 to 30 minutes at 200° to 230°C. of diethylene glycol which dissolved the short-chain telomer of tetrafluoroethylene coating, as well as any adhered polyurethane, to give a clean lower mold part.

The diethylene glycol on the lower mold part is removed with solvents such as acetone or methylethyl ketone or alcohol wash, the preferred solvent being ethylene glycol monoethyl ether and dried to remove the solvent and is ready to receive another coating of the short-chain telomer of tetrafluoroethylene to give the first release coating and thus permit the lower mold part to be returned for use on the molding line where polyethylene and polyvinyl alcohol release coats are applied just prior to each molding.

While certain representative embodiments and details have been shown for the purpose of illustrating the invention, it will be apparent to those skilled in this art that various changes and modifications may be made therein without departing from the spirit or scope of the invention.

What is claimed is:

1. In a method of molding polyurethane articles from a polyurethane reaction mixture by applying mold release agent to the mold, charging a polyurethane reaction mixture into the mold and permitting said reaction mixture to react and set prior to removal from the mold, the improvement wherein the mold release coatings comprises a coating of a polyhalocarbon a hydrocarbon mold release agent selected from the class consisting of wax, polyethylene and polypropylene and a coating over the hydrocarbon mold release agent of polyvinyl alcohol.

2. The method of claim 1 wherein the molded polyurethane article is water washed at 70° to 95°C. and dried to present a surface receptive to painting.

3. The method of claim 1 wherein the hydrocarbon mold release agent is applied over a semi-permanent polyhalocarbon film of a short-chain telomer of tetrafluoroehtylene on the mold surface.

4. The method of claim 3 wherein the mold has been used until debris begins to collect and is regenerated by washing the mold release agent from the mold with hot diethylene glycol and washed with a solvent and then recoated with the mold release coatings, said coatings being applied successively as follows: polyhalocarbon coating hydrocarbon mold release coating and polyvinyl alcohol coating.

5. The method of claim 4 wherein the diethylene glycol is about 200° to 230°C. and the solvent is ethylene glycol monoethyl ether.

* * * * *